United States Patent [19]

Shields et al.

[11] 4,204,845
[45] May 27, 1980

[54] METHOD OF HEAT TREATING MOVING GLASS SHEETS ON MODIFIED GAS BED

[75] Inventors: George B. Shields, Lower Burrell; Eugene W. Starr, Allison Park, both of Pa.

[73] Assignee: PPG Industries, Inc., Pittsburgh, Pa.

[21] Appl. No.: 945,718

[22] Filed: Sep. 25, 1978

[51] Int. Cl.² .............................................. C03B 27/00
[52] U.S. Cl. ..................................... 65/25 A; 65/114
[58] Field of Search ................... 65/25 A, 114, 182 A, 65/351

[56] References Cited

U.S. PATENT DOCUMENTS

| | | | |
|---|---|---|---|
| 3,223,500 | 12/1965 | Misson | 65/25 A |
| 3,300,290 | 1/1967 | Misson | 65/25 A |
| 3,395,943 | 8/1968 | Wilde | 302/31 |
| 3,607,198 | 9/1971 | Meunier | 65/182 A |
| 3,672,861 | 6/1972 | Ritter, Jr. et al. | 65/114 |
| 4,046,543 | 9/1977 | Shields | 65/25 A |

FOREIGN PATENT DOCUMENTS

787880 2/1973 Belgium.
2024397 10/1971 France ........................................ 65/114

Primary Examiner—Arthur D. Kellogg
Attorney, Agent, or Firm—Dennis G. Millman; Edward I. Mates

[57] ABSTRACT

This invention relates to the tempering of glass sheets, and particularly concerns cooling heat-softened glass sheets sufficiently rapidly to induce a stress pattern through the thickness of the glass of sufficient magnitude to temper the glass sheets with minimum surface deformation in a process where flat glass sheets are conveyed while supported on a modified gaseous bed that comprises an upstream portion having opposed modules with thin slotted openings that provide thin, discrete, laminar streams of tempering medium against the opposite major surfaces of said glass sheets and a downstream portion having opposed modules that provide a smoother support bed than said discrete streams through a more diffuse pattern of tempering medium.

5 Claims, 7 Drawing Figures

METHOD OF HEAT TREATING MOVING GLASS SHEETS ON MODIFIED GAS BED

BACKGROUND OF THE INVENTION

1. Field of the Invention

This invention relates to the tempering of glass sheets and, more specifically, to the cooling of hot glass sheets involved in their tempering while conveying the sheets through a cooling area immediately downstream of a furnace wherein the conveyed sheets are supported on a gaseous bed with their major surfaces out of contact with solid members. This cooling involves a system for supplying gas in heat exchange relationship and/or supporting relationship to a sheet or ribbon of glass. The support system is particularly adapted for handling glass in sheet or ribbon form without marring or otherwise producing uncontrollable deformation in the major surfaces of the sheet, even when the glass is at a deformation temperature.

Tempering produced by heating a glass sheet above its annealing range and then rapidly chilling its surfaces to below the strain point while the interior is still hot and continuing the rapid chilling until the entire glass sheet cools to below its strain point causes the glass sheet to develop a skin of compression stress that surrounds the glass interior which is stressed in tension. Such a stress distribution makes the glass sheet much stronger than untempered glass so that tempered glass is less likely to fracture than untempered glass when struck by an object. Furthermore, in the less frequent times when an outside force is sufficiently large to cause tempered glass to fracture, tempered glass breaks up into a large number of relatively smoothly surfaced, relatively small particles which are far less dangerous than the relatively large pieces with relatively jagged edges that result from the fracture of untempered glass.

In fabricating glass through known manufacturing techniques of bending, tempering, annealing or coating and combinations of such techniques to form end products having characteristics and uses different from the original product, it is necessary to heat the glass sheets to a temperature above that at which the major surfaces or the contour thereof is changed by deforming stress on contact with solid members. Where it is desired to strengthen the glass, it is further ncessary to cool the glass sheets rapidly from such a deformation temperature to a lower temperature below the annealing range of the glass. The effectiveness of such strengthening is improved by an increase in the rate at which heat is removed from the surfaces with respect to the center of the thickness of the glass sheets.

Efficient glass sheet fabrication involving the techniques previously mentioned requires that the glass sheets undergoing treatment be conveyed while hot. The need to convey glass sheets at high temperature has involved undesirable deformation or marring of the major surfaces of glass sheets undergoing treatment due to physical contact of its major surfaces with supporting and conveying apparatus while the glass is at elevated temperatures. Glass sheets have been supported on gaseous beds to overcome the defects of deformation and marring due to physical contact of their major surfaces with solid members at elevated temperatures. Glass sheets have been conveyed through these gaseous beds by supporting the sheets at a small oblique angle to the horizontal and engaging the lower edges thereof with the peripheries of rotating driving discs.

Attempts to cool the glass surfaces rapidly has involved the development of modules for supplying cool gas in a pressure pattern that is non-uniform across the dimension of the glass sheets transverse to their direction of movement through a space between opposite arrays of modules disposed above and below the upper and lower major surfaces of the conveyed glass sheets. Non-uniform rates of cooling have developed non-uniform stress patterns, which are accompanied by optical non-uniformities, sometimes called Q-lines.

One technique for minimizing the appearance of Q-lines has been the application of blasts of air through narrow elongated slots, preferably narrower than one millimeter, extending continuously across the entire width of the conveyed glass sheets. Recognizing that it is difficult to maintain uniform width along the entire length of narrow slots, the prior art used thin mesh screens to separate the walls of the narrow slots and to maintain the uniformity of slot width. The presence of screens impaired the free flow of air through the slots and, hence, limited the heat transfer rate due to the impingement against the glass surface by gas streams flowing through the narrow slots en route to the glass surface. It became necessary to make the prior art modules hollow and to flow heat exchanging liquid through the hollow passages within the hollowed modules to improve the heat exchange rate by radiation. This solution introduced the problem of handling a liquid supply system.

Another technique for improving the uniformity of tempering medium applied across the entire width of glass sheets is the provision of longitudinally spaced modules having thin slots that extend obliquely of apertured, glass facing walls along the length of the modules so as to avoid the need for reinforcements interconnecting the walls of the modules that support the apertured walls, or for screens within the slots that help maintain a uniform width of slot. Such reinforcements break up the flow pattern of tempering medium en route to the major glass sheet surfaces and disrupt the uniformity of cooling pattern that would result if the flowing pattern were not interrupted locally. In addition, the oblique slots have limited length so that the module walls provide sufficient rigidity to maintain uniform slot width without requiring internal reinforcements or screens that interrupt free flow of tempering medium.

The use of thin slots permits a series of high velocity air jets which promote a high heat transfer coefficient at the major glass sheet surfaces using a given rate of flow of tempering medium. The oblique slots are arranged relative to the apertured walls of the modules in such a manner that adjacent slots of each module overlap one another along the length of the elongated bed. Thus, each glass sheet increment transverse to the path of glass sheet movement intercepts a plurality of oblique blasts imparted through oblique slots as it traverses the portion of said path in alignment with each of said modules. This arrangement provides substantially uniform cooling from transverse increment to transverse increment without requiring devices that impair the free flow of tempering medium as the cost of insuring uniformity of slit width over a long slot. The overlapping of slots along the path of glass movement causes the cooling of the glass surface to be sufficiently uniform as to minimize the development of Q-lines.

When glass must be tempered, a large escape area must be provided for the impinging blasts of cooling medium, such as air, to be released readily from the central portion of the gaseous bed to avoid the establishment of a non-uniform pressure profile across the width of glass sheets transverse to the direction of glass movement. Such pressure profile increases toward the center of the glass and causes the glass to develop one of two metastable conditions, one in which the center of the glass sheets bows upward and another in which the center of the glass sheets bows downward.

When glass is supported on a gaseous support, the thickness of the gas bed is maintained as thin as possible to enable the incoming gas streams to impinge on the glass surface as efficiently as possible rather than blending with the gas bed that is already present. Therefore, when the glass develops a bowed shape due to the metastable conditions described previously, there is insufficient room for the glass to be conveyed between the upper and lower arrays of modules that supply the gaseous cooling medium needed to cool the glass sufficiently rapidly to develop a stress pattern through the glass thickness that strengthens the glass sufficiently so that the glass develops at least a partial temper.

The final temper level in a glass sheet depends on the following variables:

1—Coefficient of thermal expansion of the glass in the viscosity range of $10^{10}$ to $10^{15}$ poises.
2—Relaxation characteristics of the glass in the viscosity range of $10^{10}$ to $10^{15}$ poises.
3—Heat conductivity and specific heat of the glass, including radiation characteristics.
4—Glass thickness.
5—Temperature distribution of the glass at instant cooling starts.
6—Time spent in various cooling stages.
7—Heat flux at the glass-tempering medium interface. Heat flux involves both heat transfer coefficient and the temperatures of the glass and the medium.

For a given glass composition, equal heat extraction at the surface and equal temperatures, thicker glass sheets attain a higher temper than thin glass sheets.

The higher the glass temperature at the onset of cooling (up to a certain value), the higher the final residual stress attained.

The lower the apparent heat conductivity (which includes radiation) the higher is the stress attained.

Temper levels are higher with higher heat extraction rates at the surface.

Higher residual stresses are obtained with glasses having larger coefficients of thermal expansion in the viscosity range of $10^{10}$ to $10^{15}$ poises.

Higher tempers result (up to a certain limit) by increasing the duration of exposure to rapid cooling.

Optical defects become more severe when glass sheets have greater variability in local heat flux rates.

The "faster" the relaxation characteristics, the higher is the temper level attained.

In prior art apparatus providing thin, elongated slots for the application of gas under pressure interspersed with elongated slots for gas removal, glass sheets tended to develop vibrations or flutter in their thickness direction as they were conveyed through the cooling area. The severity of these vibrations was greater for glass sheets of lesser thickness and for stronger streams of tempering medium. Thinner glass sheets have become more popular lately and stronger streams of tempering medium are generally needed to impart a desired level of temper in thinner glass sheets. Stronger streams are obtained by applying higher pressures of tempering medium to the modules for discharge through the elongated slots and/or by floating the glass sheets in closer spacing to the slotted walls of the modules as the sheets travel through the cooling area. From time to time, breakage rates increased during mass production operations. Modules providing individual, more diffuse patterns of tempering medium did not develop such strong vibrations and flutter. However, the presence of Q-lines in tempered sheets of less thickness made on apparatus having modules imparting individual patterns of tempering medium made it advisable to seek a solution to the Q-line problem other than one involving modules imparting more diffuse individual patterns.

Other attempts to avoid the presence of Q-lines involved the use of fluted modules that provide curved passages that guide streams of tempering medium against the opposite major surfaces of glass sheets travelling through the cooling area. The streams of tempering medium imparted through the openings of the fluted modules are relatively wide compared to the narrow slots of the modules with slot openings. Consequently, while tempering apparatus having fluted modules in the cooling area reduce the tendency for the tempered glass sheets to develop Q-lines, the degree of temper developed leaves something to be desired unless exceedingly large blowers are used to develop the pressure within the fluted module. In treating thinner glass sheets having a nominal thickness of 3 millimeters and less, these problems are increased.

Attempts have been made prior to the present invention to use fluted modules in the upstream portion of the cooling area of tempering apparatus and so-called "rosette" modules that impart discrete diffused patterns of tempering medium in the downstream portion of the cooling area. Such attempts have resulted in improved temper stresses in glass sheets cooled in such apparatus compared to those fabricated with apparatus having fluted modules disposed throughout the entire length of the cooling area. However, the incorporation of "rosette" modules resulted in the presence of Q-lines when the tempered glass sheets were inspected by exposure at a very oblique angle to a light path from a lamp.

2. Description of the Prior Art

U.S. Pat. No. 3,607,198 to Meunier et al discloses a method and apparatus for moving hot glass sheets and similar ribbons that are supported pneumatically out of contact with solid surfaces by establishing alternate zones of static and kinetic gas pressure along the path of sheet movement. Each zone extends substantially across the full width of the sheet. Cool air under pressure is applied through a first multiplicity of slots, which are parallel and extend continuously substantially the full width of the ribbon and a second multiplicity of exhaust slots for the exhaustion of air applied through the first multiplicity of slots. A pair of pressure applying slots is located between each consecutive two exhaust slots. The distance between the pressure applying slots of a pair is greater than the distance between each pressure applying slot and its adjacent exhaust slot. The total area occupied by the slots is not substantailly more than 10 percent of the whole glass sheet facing surface of the supporting bed. The pressure applying slots are preferably between 0.4 and 0.7 millimeter and need not be greater than 1 millimeter wide, and the exhaust slots are between 1.5 and 2 millimeters wide.

The Meunier et al patent is designed for annealing glass sheets. Hence, even if there is some backward flow of the support gas into the furnace, it is not so extensive as to impair the annealing process or to cause glass breakage as would be the case were the glass being tempered.

While this patent states its system can be used for tempering as well as annealing glass, it requires hollow passages in the slotted module housings and liquid to flow through the hollow passages to supplement the air cooling with radiation cooling. The small proportion of apertures in the Meunier et al apparatus makes it impractical for tempering by use of gas blasts exclusively. The need for a water supply system to supplement the gas supply system makes the Meunier et al apparatus awkward to use. The gas exhausted in the Meunier et al apparatus is recirculated. Such recirculation impairs the efficiency of the gas applied to cool the glass sheets unless the gas is cooled during its recirculation.

Furthermore, in handling sheets having a width on the order of 30 centimeters or more, it is difficult to maintain continuous uninterrupted slots of uniform width across the entire width of the glass sheets without reinforcing the modules containing slotted walls facing the opposite major glass sheet surfaces. The reinforcements, if in the form of wire mesh as in the Meunier et al apparatus, disrupt the continuity and uniformity of the flow of gas through the slots. If the reinforcements are solid members interconnecting the walls of the modules beneath the slotted walls, they have to be so close to the slots in the slotted walls to insure uniform width that they interrupt the continuity and uniformity of gas flow. Any substantial non-uniformity of gas flow imparts non-uniform cooling in an amount sufficient to cause Q-lines in the glass, particularly from modules installed in close proximity to the exit of the furnace.

Without the reinforcements or wire spacers in the slots of the module construction, the elongated slots develop non-uniform width which causes a non-uniform application of cooling medium even where the uniformity of flow of cooling medium is not interrupted by reinforcements. Therefore, the glass sheet heat treating art required a method of treatment different from and representing an improvement over that provided by the Meunier et al patent.

Belgium Pat. No. 787,880 to PPG Industries, Inc. discloses a method and apparatus for tempering glass sheets which contains spaced rows of so-called fluted modules, the glass facing walls of which are provided with a series of parallel arcuate vanes that cause streams of gaseous tempering medium to move in curvilinear paths that result in gas streams having a relatively large component of motion in the direction of glass sheet movement away from a furnace, and in a downstream direction of the path of glass movement where the gas streams impinge on the glass. The main purpose of directing the streams of cooling fluid downstream is to avoid flow of the cooling gas in an upstream direction into the exit portion of the furnace. Any upstream flow of cooling gas into the exit portion of the furnace cools the exit portion of the furnace and prevents the glass from developing sufficient heat for tempering and may also cause the glass sheets to leave the furnace exit at a non-uniform temperature. As a result, glass sheets insufficiently heated tend to break when subjected to streams of cooling gas downstream of the furnace exit.

Means is provided to adjust the effective exhaust area of the spaces between adjacent rows of modules. Different effective exhaust areas are most beneficial for different glass sheet thicknesses.

The tempering apparatus of the Belgium patent is composed of square modules, each provided with arcuate vanes that gradually change the direction of streams of cooling gas toward the major surfaces of the glass sheets from directions normal to the respective surfaces to directions oblique to the respective surfaces. Arcuate curving of the paths of movement for the cooling medium may cause some turbulence in the flow of cooling medium. Laminar flow is more efficient in chilling a glass surface than turbulent flow. The modules are arranged in rows 1 inch (25.4 millimeters) wide separated by spaces ranging from ¼ inch (6.35 millimeters) to ¾ inch (19.05 millimeters) depending on the thickness of glass sheets processed.

This patent is silent as to the width of the slots formed between adjacent vanes. However, the drawings would appear to indicate that each slot has a substantial width. Gas streams applied at a given rate of volume through slots of such width have less velocity than gas streams applied through thinner slots. Therefore, cooling by passing cold fluid through the wide arcuate slots between adjacent arcuate vanes requires very large blowing equipment that consumes much energy. Such high energy consumption provides an inefficient operation and is frowned upon.

French Pat. No. 2,024,397 discloses glass sheet tempering apparatus comprising one or a plurality of slotted nozzles providing oblique passageways for the passage of tempering medium either in a direction oblique to the plane defining the path of glass travel through a cooling area through slots extending along lines normal or oblique to the path of glass sheet travel to direct cooling medium toward the opposite glass surfaces. Passageways are provided for removing tempering medium in a direction parallel to the plane of the sheet and transverse to the path of glass travel after the medium impinges on the opposite major surfaces of the glass sheets as the latter pass through the cooling area. The passageways for removing tempering medium have restricted openings which inhibit the free removal of tempering medium from the vicinity of the respective glass surfaces. The presence of these restricted paths and the need to turn the blasts of tempering medium into directions normal to the component of blast movement parallel to the path of glass travel make the apparatus of the French patent less efficient than desired to remove the tempering medium from the glass after the tempering medium has cooled the glass surface. The glass sheets are conveyed either by roller discs that engage an edge of each glass sheet or rollers that engage a supported major surface of the glass sheets and also provide boundaries for exhaust passages for removing tempering medium. Various embodiments of nozzle arrangements are disclosed, such as modules with obliquely extending slots facing the upper glass sheet surface combined with individual modules that impart individual diffused patterns against the bottom glass sheet surface downstream of a pair of nozzles that face the opposite major surfaces of the glass sheets immediately downstream of the furnace exit.

U.S. Pat. No. 3,395,943 to Wilde discloses the use of gaseous streams for maintaining a gaseous support under a glass surface and directs additional gaseous streams against the exposed periphery capable of developing forces transversely of the sheet. Some of these additional gaseous streams are directed against the rear edge to propel the glass sheet forwardly and other gaseous streams are directed transversely to maintain the lateral position of the sheet.

U.S. Pat. No. 4,046,543 to George B. Shields discloses apparatus for cooling and tempering glass sheets that comprises spaced slotted modules that face the opposite surfaces of a glass sheet throughout the length of a cooling area. Cold tempering medium is applied through oblique slots that direct air blasts obliquely away from a furnace exit in a downstream direction of glass sheet movement. The slots are formed in walls of longitudinally spaced, transversely extending modules and are oriented to apply a downward component of motion to the air blasts that impinge against the opposite glass sheet surfaces to force the lower edges of the glass sheets against rotating discs that propel the glass sheets through the cooling area (or at least in the upstream portion of the cooling area).

Uniformly wide spaces provided in uniformly spaced relation between adjacent modules having uniformly spaced slot openings to insure escape of applied tempering medium are believed to provide a resultant effect that causes the glass sheets to flutter as they travel through the cooling area, according to the theory behind the present invention. Modifying the spacing and width uniformities introduces other problems that are hard to solve.

Despite all the patents enumerated, a need still existed to produce thin glass sheets having higher temper values combined with optical properties superior to those obtainable from the prior art and with fewer production losses. The present invention provides a novel combination of selected prior art features to attain such desired results.

SUMMARY OF THE INVENTION

The present invention provides a glass tempering apparatus comprising novel combinations in an elongated cooling area comprising a plurality of longitudinally spaced modules immediately downstream of the furnace exit that are provided with thin slots directed so as to provide a plurality of thin, discrete laminar streams of tempering medium in the upstream portion of the cooling area and in the downstream portion of said cooling area, a plurality of rows of so-called "rosette" modules having openings that provide discrete flows of a more diffuse pattern of tempering medium flow than said thin, discrete, laminar streams and, as a consequence of said diffuse patterns of cooling medium, a smoother support bed than the one provided by said thin, discrete, laminar streams. A sufficient number of modules with thin slots is provided to enable the thin, discrete, laminar streams to cool the major surfaces of said glass sheets sufficiently to harden the major surfaces but the number of laminar streams is insufficient to cause the glass sheets to vibrate or flutter between said slotted modules. The glass sheet tempering apparatus so constructed provides glass sheets having a desired temper level that are relatively free of Q-lines with much less loss due to breakage during fabrication than prior art apparatus. The present invention also provides a method of tempering glass sheets for which said apparatus is particularly useful.

In a specific embodiment of the present invention, each module is provided with means to simplify attachment to or removal from an elongatedd plenum chamber. Different module arrangements may be required for processing glass sheets of different thicknesses and/or widths. Facility in changing module configurations with minimum loss of time from production is an important feature to enable this apparatus to process different patterns.

In a specific embodiment of this invention, the elongated plenum chambers are arranged in groups, each group communicating with a common plenum chamber. Means is provided to supply gaseous tempering medium under pressure to each common plenum chamber with means for controlling the pressure disposed in the supply system for each common plenum chamber so that the pressure of the gaseous tempering medium applied to each common plenum chamber may be controlled independently of the pressure for each other common plenum chamber. Several elongated plenum chambers extend across the cooling area of glass sheet tempering apparatus from each of the common plenum chambers. The latter are located both above and below a path of glass sheet travel. The upper common plenum chambers are pivoted on pivot means. All of the latter are disposed to one side of the apparatus and extend longitudinally of the path of glass sheet travel to permit operating personnel access to the other side of the apparatus when needed for maintenance, repair or substitution of modules.

The present invention will be better understood in the light of a description of an illustrative embodiment thereof. Although the illustrative embodiment refers to tempering apparatus that uses a gaseous tempering medium such as air to cool hot glass sheets sufficiently rapidly to impart a temper, it is understood that the term "gaseous" for the purpose of the present invention includes vapors, mixtures of gases, mixtures of gases and vapors, sublimable materials, and mixtures of gases with sublimable materials. In fact, the tempering media suitable for use with the present invention may incorporate materials whose heat of evaporation or heat of sublimation may provide at least part of the cooling effect required for the tempering medium. Only materials that react chemically with the glass surfaces to weaken the latter when directed thereagainst are excluded from materials suitable for use as tempering media.

In describing the present invention, the term "tempering" is intended to mean establishing a stress pattern in a glass sheet having a surface compression stress of at least 10,000 pounds per square inch (about 340 kilograms per square meter) as measured by a DSR refractometer described in "The Nondestructive Measurement of Surface Stresses in Glass" by R. W. Ansevin, ISA Transactions, Volume 4, Number 4, October 1965.

BRIEF DESCRIPTION OF THE DRAWINGS

In the drawings that form part of a description of an illustrative embodiment of the present invention and wherein like reference numbers refer to like structural elements.

DESCRIPTION OF THE ILLUSTRATIVE EMBODIMENT

Figure 1:
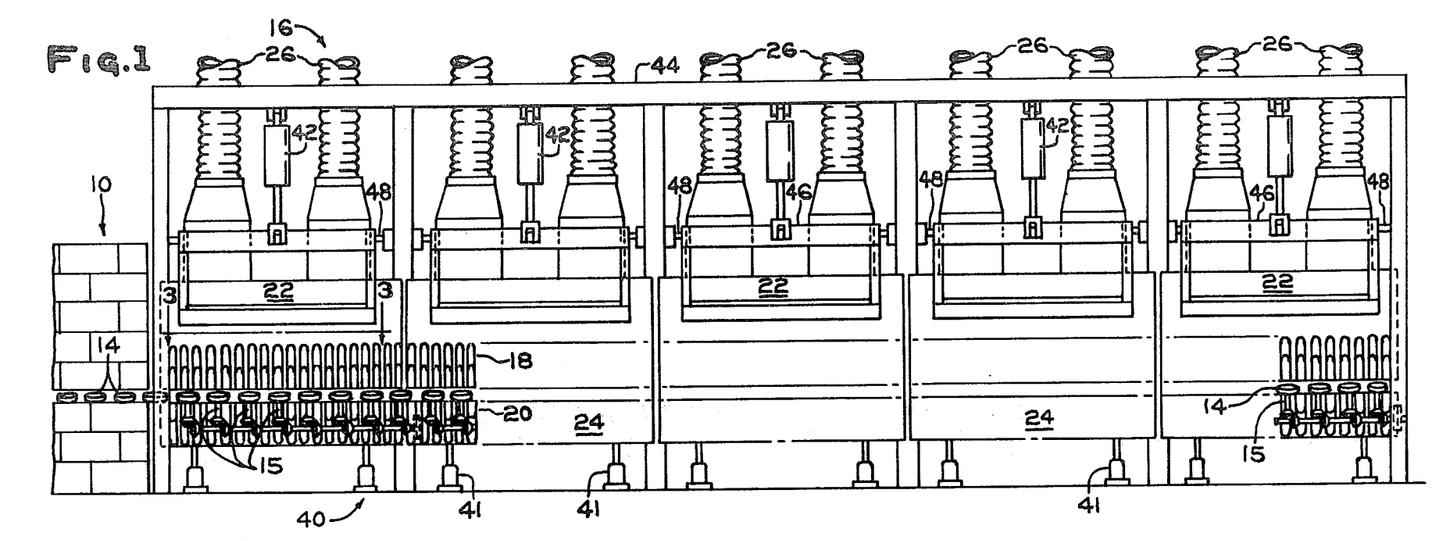
FIG. 1 is a fragmentary longitudinal side elevation of a portion of glass sheet tempering apparatus incorporating an illustrative embodiment of the present invention with special emphasis on its cooling area.
Figure 2:
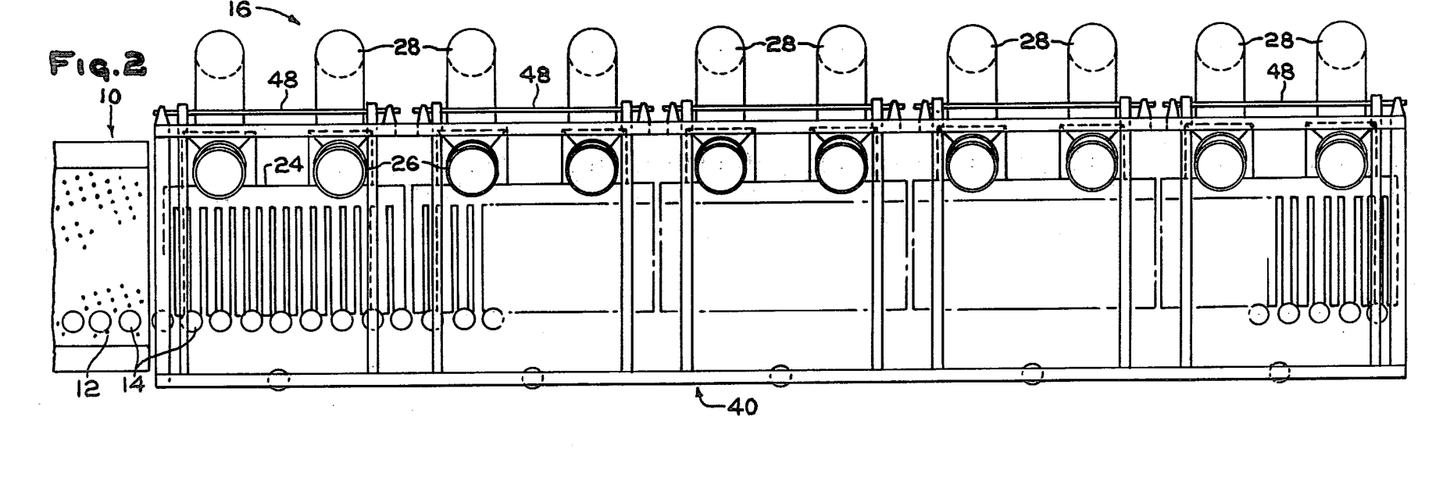
FIG. 2 is a fragmentary, longitudinal sectional view of the portion of the apparatus depicted in FIG. 1.

Referring to the drawings, an illustrative embodiment of apparatus incorporating the present invention comprises a gas hearth type furnace 10 of the type depicted in U.S. Pat. No. 3,300,290 to George W. Misson. In such a gas hearth furnace, glass sheets are introduced into a support area at a temperature below that at which the major surfaces will mar on physical contact with solid objects. The glass sheets are heated in turn above the deformation temperature while being supported primarily by gas supplied through apertures in a gas support bed 12 (FIG. 2) and the glass sheets are cooled after they leave the furnace to a temperature below deformation temperature before they are removed from a gas support. When glass sheets are so treated, the heating is usually supplied by hot gas through the gas support bed supplemented by radiant heat supplied by heaters within the furnace 10. The latter are usually electrical radiant heaters, although gas heaters may also be employed. After the glass sheets are heated to a temperature sufficient for tempering, they are usually cooled sufficiently rapidly to temper and, hence, strengthen the sheets.

According to a typical gas hearth operation, the gas support bed 12 is supported on vertically adjustable jacks (not shown) which support the bed 12 so that its upper surface extends transversely to its length at a slight oblique angle (less than 15 degrees) to the horizontal, usually approximately 5 degrees, and the glass sheets while supported on a gaseous support of the gas support bed 12 in such a tilted relationship to the horizontal have their lower edges driven by friction in contact with a plurality of rotating driving discs 14 of uniform diameter, each mounted on a different drive shaft 15. The latter are aligned along a line parallel to the longitudinal dimension of the gaseous bed 12 so that the driving discs 14 have a common tangential line extending parallel to the direction of movement of the glass sheets.

Beyond the gas hearth type furnace 10 is a cooling area 16, at one side of which are located additional rotating driving discs 14 aligned with the driving discs that propel the glass sheets through the gas hearth type furnace 10. In the cooling area, there are a plurality of longitudinally spaced, upper, elongated plenum chambers 18 directly opposing a corresponding series of lower, elongated plenum chambers 20, the latter being arranged in alignment with the bed 12 to form a continuation thereof at the same orientation as that of the bed. The plenum chambers 18 and 20 are in the form of narrow elongated fingers having non-uniform height and extend parallel to one another transversely of the length of the cooling area 16. The higher ends are disposed to the side of the cooling area opposite the side occupied by the rotating driving discs 14, and merge into respective upper and lower common plenum chambers 22 and 24, respectively. Each of the upper common plenum chambers 22 communicates through one of a series of flexible upper supply conduits 26 to blower means (not shown). The lower common plenum chambers 24 are connected through flexible lower supply conduits 28 to blower means (not shown). Suitable pressure controls are provided by way of adjustable valves (not shown) in the supply conduits 26 and 28.

The illustrated apparatus comprises five upper common plenum chambers 22 and five opposite lower common plenum chambers 24. Each common plenum chamber is supplied with pressurized air through two flexible supply conduits. There are approximately 50 upper and 50 lower elongated plenum chambers for each common plenum chamber, except that the first upper and lower common plenum chambers are subdivided into two zones, each individually controlled and each communicating with about 25 elongated plenum chambers. However, the exact number of elongated plenum chambers for each common plenum chamber and/or the exact number of common plenum chambers can be varied according to the design of the system.

Figure 3:
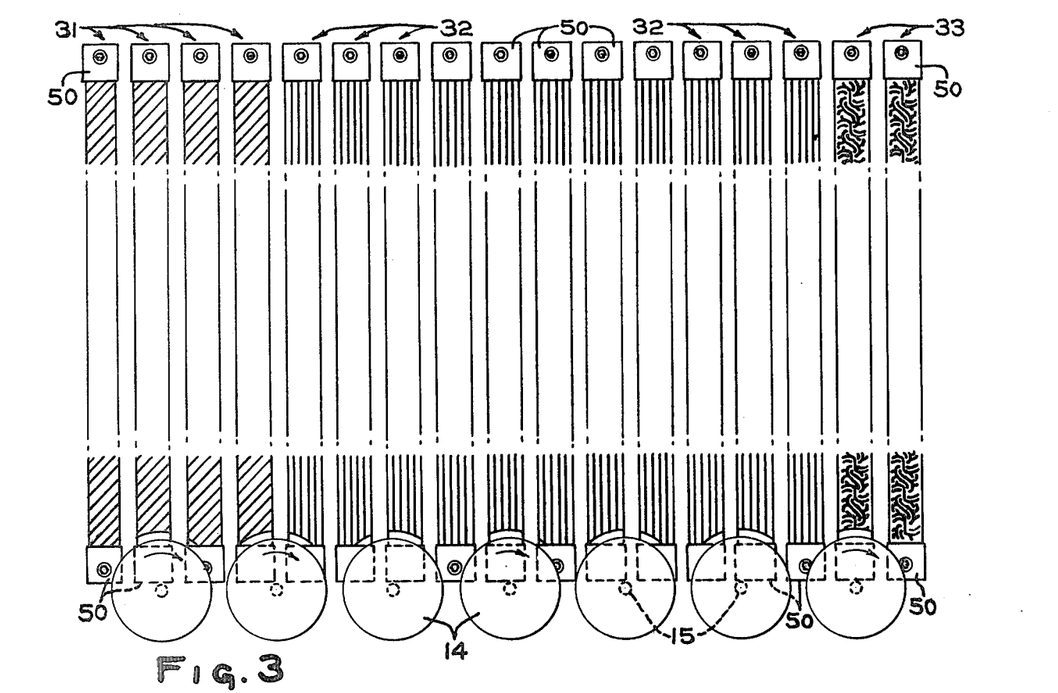
FIG. 3 is an enlarged, fragmentary, plan view taken along the line 3—3 of FIG. 1 showing how lower elongated plenums and their associated modules of a pair of opposing upper and lower elongated plenums are arranged in said apparatus.

Each of the elongated upper plenum chambers 18 and elongated lower plenum chambers 20 is attached to a module 31 or 32 or to a row of "rosette" modules 33 (FIG. 3). Each module is closed at its ends and has an open side facing its attached elongated plenum chamber. Each upper module 31, 32 or 33 has a lower apertured wall 36 and each lower module has an upper apertured wall 38 so that gas supplied under pressure is directed through openings through the thickness of the apertured walls 36 and 38. The array of openings of the walls 36 are either exact mirror images or approximations of mirror images of the array of openings of the corresponding walls 38 opposite thereto in the illustrative embodiments described.

The slots of the upstream modules 31 of opposed upper and lower modules are angled to provide a component of force for cold gas in a downstream direction of movement for glass sheets away from the exit of the furnace 10 when cold air is supplied under pressure to the elongated plenum chambers 18 and 20. In addition, the slots of modules 31 extend obliquely across the apertured walls 36 and 38 at an angle such that a component of force is provided to urge the glass sheets in a downward direction transverse to the path of movement to force their lower edges into a slightly greater frictional engagement against the inner common tangential line of the driving discs 14 than would be provided by the mass of each glass sheet alone. To provide this feature, the slots for the apertured walls of each of the modules, in the first part of the cooling area 16, are angled through the slotted wall of their respective modules facing the opposite surfaces of glass sheets moving between the upper plenum chambers 18 and the lower plenum chambers 20 so that the upwardly facing apertured walls 38 of lower modules 31 are provided with narrow, elongated slots that are disposed obliquely across their upper surfaces as depicted in FIG. 3. The angle of obliquity can be 20 to 70 degrees with respect to the axis of movement of the glass sheets. However, the view of FIG. 3 shows the slots angled at 45 degrees to the path of movement.

The downwardly facing apertured walls 36 of upper modules 31 have their lower surfaces provided with slots that are also angled to provide a mirror image of the angling of the slots through the apertured walls 38 of the lower modules 31. This obliquity of the surface slots in walls 36 and 38 provides the component of motion transverse to the path of glass sheet movement that insures sufficient frictional force between the glass sheets against the rotating driving discs 14 to insure uniform movement of the glass sheets through the cooling area 16.

Figure 5:
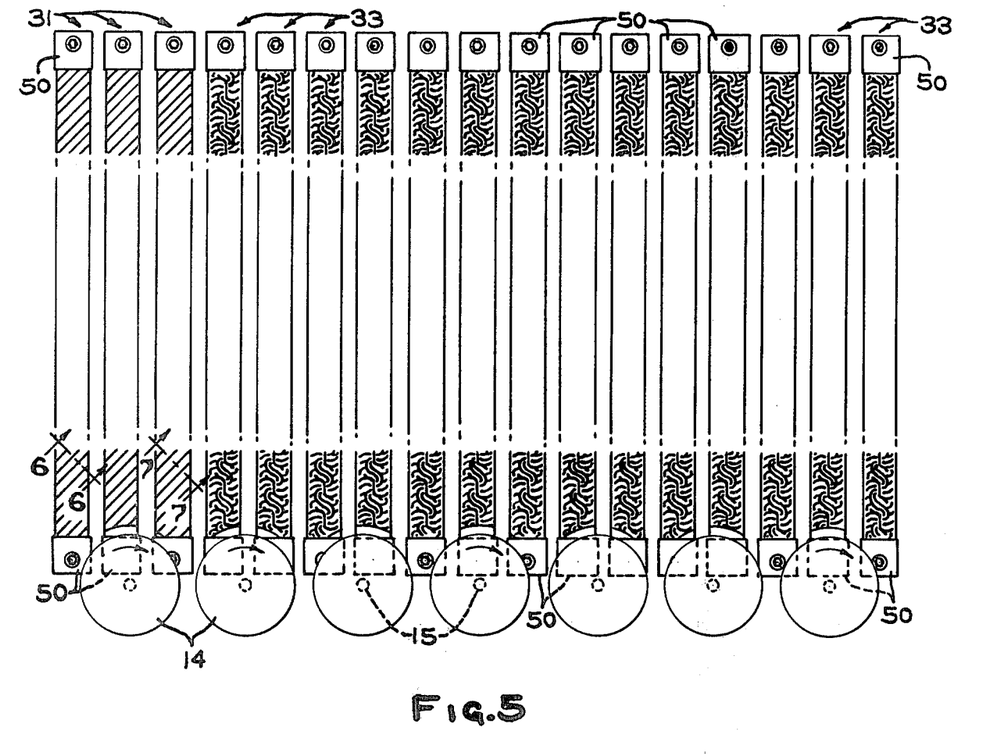
FIG. 5 is a plan view similar to those of FIGS. 3 and 4 of still another embodiment of the present invention.
Figure 6:
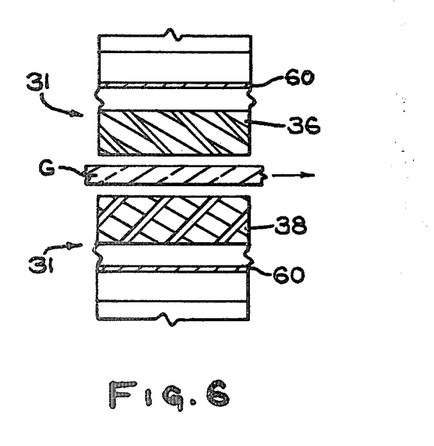
FIG. 6 is an enlarged section taken along the lines 6—6 of a portion of a module depicted in FIG. 5.
Figure 7:
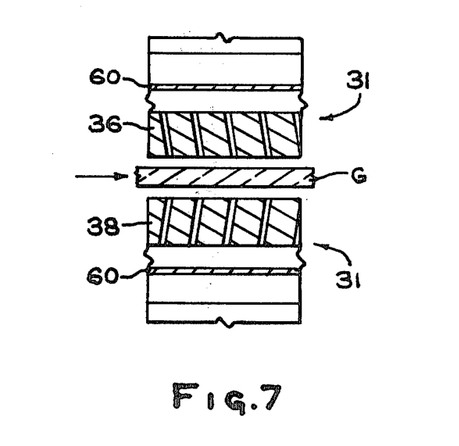
FIG. 7 is an enlarged sectionalized view taken along the lines 7—7 of a portion of a different module depicted in FIG. 5.

FIGS. 3, 5, 6 and 7 show how the slots are directed obliquely through the thickness of the apertured walls 36 and 38 of the modules 31 in a direction toward the glass sheet movement path at different positions along the first zones. Near the furnace exit as shown in FIG. 6, the slots extend at a maximum forward angle of obliquity to minimize the chance of cold tempering medium flowing upstream into the furnace 10. At an intermediate position depicted in FIG. 7, the slots extend at a smaller angle of obliquity and in the downstream positions of the first zone and throughout the second zone extend through the wall thickness normal to the glass major surfaces. Such combination of obliquities permits a combination of low chance of upstream flow of tempering medium that would cool the furnace with most efficient glass surface cooling consistent with minimum surface distortion.

The upper surface of the apertured walls 38 of the lower modules 31, 32 and 33 are aligned with the upper surface of the gaseous bed 12 in the furnace 10. Thus, glass sheets are supported for movement along a path of glass sheet movement through the furnace 10 and the cooling area 16 in approximately the same oblique plane with their lower major surface supported on a gaseous bed of hot gas within the hot furnace and on a supporting bed of cool gaseous tempering medium, usually pressurized air, within the cooling area 16.

The lower plenum chambers 20 and the lower common plenum chambers 24 are vertically adjustable relative to a support structure 40 through jacks 41. Each of the upper common plenum chambers 22 and their elongated upper plenum chambers 18 are pivoted to the support structure 40 through a piston arrangement 42. The latter is pivotally attached to a rigid super-structure 44 of the support structure 40 at its upper end and at its lower end to a cantilever housing 46 to which an associated upper common plenum chamber 22 is attached. Each cantilever housing 46 is pivoted on pivot rods 48 carried by the support structure 40. The piston arrangements 42 are useful to pivot the cantilever housings 46 about their respective pivot rods 48, which extend longitudinally of the cooling area 16, to separate the upper plenum chambers 18 from the lower plenum chambers 20 whenever it is necessary to inspect the apparatus or provide some sort of maintenance or repair to the cooling area 16. The pivot rods 48 are located on the longitudinally extending side of the cooling area 16 that is also occupied by the tempering medium delivery system comprising the flexible upper supply conduits 26 and the flexible lower supply conduits 28. This leaves sufficient space for operating personnel to gain access to the space between the upper elongated plenum chambers 18 and the lower elongated plenum chambers 20 when the piston arrangement is actuated to separate the respective associated upper common plenum chamber 22 from its opposite lower common plenum chamber 24.

In FIG. 3, the upstream lower elongated plenum chambers 20 are shown comprising four modules 31 having obliquely extending slotted openings in their upper apertured walls 38 followed by eleven modules 32, each having four transversely extending slotted openings in their upper apertured walls 38. The remainder of the cooling area 16 is provided with rows of "rosette" modules 33, whose upper apertured walls 38 are of square outline. The "rosette" modules 33 are of the general type depicted in FIGS. 12 and 13 of U.S. Pat. No. 3,223,500 to George W. Misson, the description of which is incorporated in this specification by reference.

Each "rosette" module 33 is aligned with other like modules to form a row of "rosette" modules 33. The dimension of each row of "rosette" modules 33 in the direction of glass sheet movement through the cooling area 16 and the spacing between adjacent rows of "rosette" modules in said direction approximates the corresponding dimensions of and spacing between the adjacent slot-type modules 31 and 32. It is understood that the downwardly facing lower apertured walls 36 of the upper modules 31 and 32 and the upper rows of "rosette" modules 33 oppose the upper apertured walls 38 of corresponding lower modules.

The glass sheet facing surface of each rosette module has arcuate exhaust grooves which are coplanar with pressure grooves to facilitate the exhaust of gases. While the pressure supply grooves communicate with a source of gas under pressure centrally of the module and terminate short of the rectangular side walls thereof, additional exhaust grooves are provided in the outer surfaces of walls 36 and 38 and are located between adjacent pressure grooves. Exhaust grooves communicate at one end through the module side wall with an exhaust space and terminate at the other end short of the central portion of the module. These grooves serve as exhaust zones interior of the periphery of the "rosette" module and receive gas emitted from the pressure grooves before it flows to the surrounding zone. Thus, direct conduits are provided between central portions of each "rosette" module and exhaust zones between adjacent rows of "rosette" modules. Grooves are tapered longitudinally to compensate for changes in the volume of gas present along the length of each groove. Thus, the pressure groove decreases in depth from center to outer terminus because, as the gas flows along the groove, it also flows upwardly and out so that the entire volume does not traverse the entire length of the groove. The exhaust grooves are tapered in the opposite direction, that is, increasing in volume as they approach the exhaust zone, to facilitate an increased volume in gases which have escaped from the pressure grooves and which must be carried to the module edges.

In the "rosette" modules disclosed herein, the majority of the heat transfer between the gas flowing through the modules and the adjacent sheet of material is accomplished by convection through the flow of gas from the module to the exhaust area. Only a moderate amount of heat transfer takes place through conduction between the glass sheet and the module through the gaseous medium to the module or through radiation between the glass sheet and the module. By way of example, it has been found with the "rosette" module, when used to quench a sheet of glass heated to a temperature below 1200 degrees Fahrenheit (649 degrees Centigrade), that convective cooling accounts for upwards of 80 percent of the heat transfer from the glass at gas flow rates on the order of two standard cubic feet per minute per module. At higher flow rates, this percentage increases, whereas, at higher temperatures, radiation becomes more dominant in its contribution and the above percentage decreases.

The modules of the embodiments disclosed herein may vary in size, depending upon such considerations as the size of the glass sheets to be supported and the uniformity of support height desired along the dimensions of the supported glass. While square modules having outer dimensions of approximately one inch and subdivided into eight equal arcuate grooves or subchambers have been found to be generally satisfactory for a large range of glass sheet sizes, the size of these modules may well vary in dimensions from about ⅛ to 3 inches (3 to 76 mm) on each side and need not be square, there being numerous other geometric or irregular shapes equally suitable. It will be evident that the module size of the "rosette" module may also vary and that the module or module row is designed to extend across the entire width of the conveying path. Subdivisions of these "rosette" modules of approximately ¼ inch (6 mm) across have been found to be satisfactory for a large range of glass sheet sizes. To achieve satisfactorily uniform support characteristics for sheets of glass or other sheet material heated to a deformation temperature, the distance across the upper terminus of each submodule forming the support bed should be no more than ½ of the correspondingly oriented dimension of the supported sheet and preferably should be less than 1/5 thereof. The module depth from the bottom to the outer terminus may vary, but for best support characteristics must be substantial. Normally, it will be at least 1/16 inch (1.6 mm) deep and in most cases ¼ to 1 inch (6 to 25 mm) or more.

So-called "rosette" modules thus supply a smoother support bed in a more diffuse pattern than the thin, discute, laminar streams of tempering medium provided by the slotted modules 31 and 32.

Figure 4:
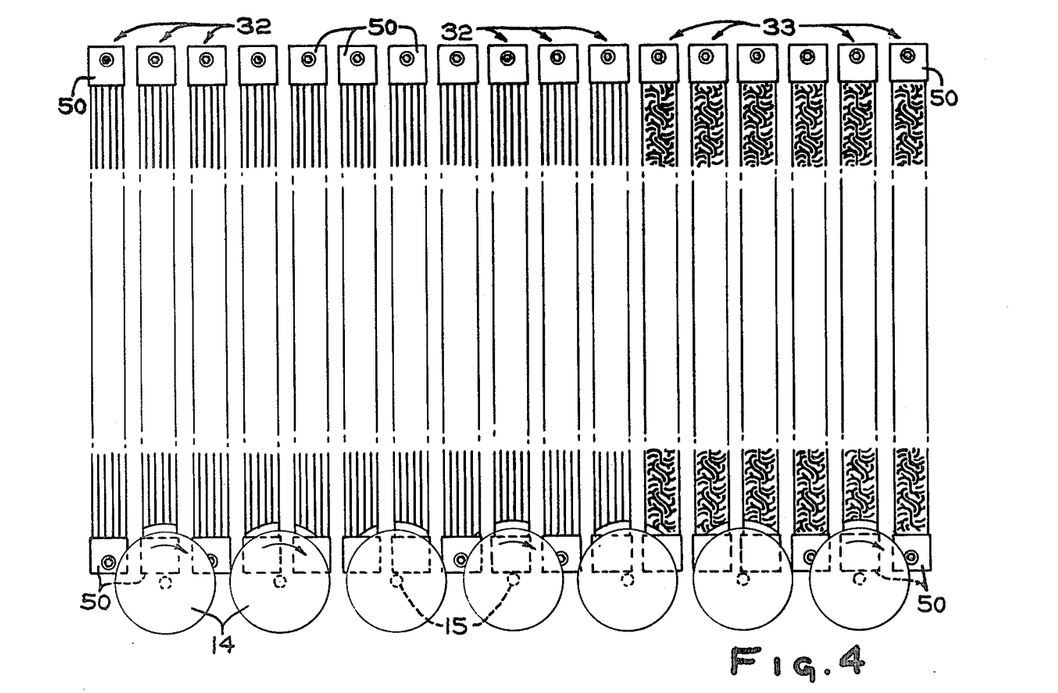
FIG. 4 is a plan view similar to that of FIG. 3 of an alternate embodiment of the present invention.

In FIG. 4, the cooling area 16 is shown comprising eleven lower modules 32 having upper apertured walls 38 provided with four transversely extending slots each followed by rows of "rosette" modules 33, only six of which are shown. In FIG. 5, the cooling area 16 is shown comprising three lower modules 31 having upper apertured walls 38 provided with obliquely extending slots followed by a plurality of rows of "rosette" modules 33. It is understood that these latter embodiments as well as the first embodiment are illustrative only of the number of slotted modules needed to harden the major glass sheet surfaces without lowering the maximum interior glass temperature to below the strain point before subjecting the sheets to the more diffuse flows of tempering medium from the "rosette" modules.

Depending on the thickness of glass sheets being processed, their speed of conveyance through the furnace and other factors that relate to the temper desired for the glass, modules of different construction and different arrangements of the combination of modules and the number of slotted modules and rows of "rosette" modules may be required. For example, the length, width, distance of separation, number of slots per module and the orientation of the slots in the apertured walls of the modules may require changing as the pattern of production parts undergoing production is changed. Therefore, it is desirable to make it possible to change a module attached to each elongated plenum chamber with facility when required.

Each end of each module is provided with an apertured end lug 50 (FIGS. 3, 4 and 5) adapted to mate with a corresponding lug (not shown) carried by the corresponding elongated plenum chamber. The lugs are readily bolted together. When attached properly, each slotted module 31 or 32 or row of "rosette" modules 33 fits exactly in communication with its corresponding elongated plenum chamber so that gaseous tempering medium applied under pressure to the elongated plenum chamber is directed through the corresponding module to be discharged through the narrow slots on the apertured wall of the module.

The apertured walls of the modules are separated from one another to provide a clearance 150 mils (3.81 millimeters) high between the opposing surfaces of the apertured walls of the opposing sets of modules when the apparatus is handling glass sheets 90 mils (2.286 millimeters) thick. In a specific embodiment of this invention, the slot modules 31 or 32 and the "rosette" modules 33 are 1 inch (25.4 millimeters) wide in the direction of glass sheet movement with a spacing of ½ inch (12.7 millimeters) between adjacent modules in said direction. The initial modules have their slots oriented at a 45 degree angle to the axis of glass sheet movement through the cooling area 16 that is parallel to the line of alignment of the driving shafts 15 of the rotating driving discs 14.

One or more of the first or upstream pair of modules 31 in FIGS. 3 and 5 are oriented through the thickness of their respective apertured walls at a forward angle of 45 degrees as is shown in FIG. 6. The succeeding pairs of opposing modules 31 in the downstream direction of glass sheet movement have their slots oriented so that they extend at a 45 degree angle with the axis of glass travel through the cooling area 16 as depicted in FIGS. 3 and 5. However, the slope of the slots through the thickness of the apertured walls of the opposing modules is at a small angle with respect to the normal to the opposite glass sheet surfaces. In a typical embodiment depicted in FIG. 7, this angle is 7.5 degrees.

Further downstream of the modules 31 within the cooling area 16 of the embodiment of FIG. 3 and immediately downstream of the exit of furnace 10 of the embodiment of FIG. 4, the opposing modules 32 have slots in their apertured walls that extend normal to the axis of glass sheet movement and that extend through the thickness of the walls in a direction normal or oblique to the major opposing surfaces of the glass sheets.

The modules 32 may be provided with internal refnforcements interconnecting the walls extending away from the apertured module walls to insure uniform slot width. The reinforcements cause some interruptions in uniformity of gas flow around the internal reinforcements. However, such internal reinforcements do not have a significant deteriorating effect on the optical characteristics of the glass when the reinforcements of adjacent modules 32 are transversely offset from one another relative to the path of glass sheet movement and are spaced below the apertured wall 36 or 38 a sufficient distance.

With the arrangement thus described, glass sheets that leave the exit of furnace 10 are cooled by blasts of relatively cool gaseous tempering medium directed with a relatively large component in the direction of glass movement immediately downstream of the furnace exit and the angle of orientation in the direction of glass sheet movement is diminished and eventually eliminated completely for gaseous tempering medium expelled through the modules disposed in the downstream portion of the first zone.

The incorporation of modules 33 that impart a more diffuse pattern should be limited to that portion of the cooling area 16 where the thin, discrete, laminar streams of tempering medium have hardened the major surfaces sufficiently to insure that subsequent individual local streams of tempering medium applied through "rosette" modules do not develop observable Q-lines. At the same time, the slot-type modules should be located in the upstream portion of the cooling area only to avoid having the glass sheets cooled to a temperature profile whose maximum interior glass temperature is below the strain point of the glass. Such an arrangement of upstream slot-type modules and downstream "rosette" modules provides a higher temper level as well as less surface distortion in the treated glass sheets for a given amount of tempering medium applied without causing significant loss due to flutter.

The additional common plenum chambers downstream of the second zone provide air under individually controlled pressure to an array of nozzles of conventional construction, such as pipe stems or slot-type nozzles having relatively large openings. These additional common plenum chambers are provided for cooling the glass to handling temperature as the temper and surface smoothness is established in the glass sheets as the latter pass through the first and second zones of the first pair of opposing common plenum chambers.

Porous members 60 in the form of screens or apertured plates or channel shaped members of a porous construction having apertures of different sizes and/or spaced with non-uniform aperture concentration along the length of each module 31, 32 or 33 may be provided, if needed, to provide more uniform flow of tempering medium from side to side of the cooling area 16. This feature may be used to control the uniformity of temper imparted to the glass sheets along their dimension transverse to the path of glass sheet travel through the cooling area.

The porous members 60 are preferably of channel shape and are made of spring-like material having separate flanges that fit snugly within screen receiving grooves contained in the modules 31, 32, and 33. Thus, air or other tempering medium that is applied to the upper and lower elongated plenum chambers 18 and 20 has its flow to different portions of the length of each module adjusted to any desired pattern controlled by the non-uniform filtering of the incoming gaseous tempering medium by virtue of the non-uniformity of the porosity along the length of the porous members 60 to provide a flow of tempering medium of any desired flow pattern against each of the surfaces of the glass sheets passing through the cooling area.

The porous members may be used to serve an additional purpose of independently controlling the rate of flow of gaseous tempering medium into each individual module supplied from a common plenum chamber. This enables operating personnel to adjust the rate of flow of gaseous tempering medium along the length of the gaseous bed in the cooling area 16.

Where required, the lower modules 31, 32 or 33 have recessed outer portions constructed and arranged in such a manner as to provide clearance spaces for the rotating driving discs 14. The clearances enable the driving discs 14 to have access to the edge of the glass sheets as the latter pass between opposed modules.

In a specific embodiment of the invention, the slots of the slotted modules are of uniform width about 20 mils (approximately 0.51 millimeter) wide, although slot widths ranging from about 10 mils (approximately 0.25 millimeter) to 1/32 inch (approximately 0.8 millimeter) wide are acceptable. The modules 31, 32 and 33 are one inch (25.4 millimeter) wide and spaced one-half inch (12.7 millimeter) from one another along the path of glass sheet travel.

The slotted modules 31 and 32 have a wall thickness of ⅛ inch (approximately 3.2 millimeters) for the side walls and approximately 3/16 inch (approximately 4.8 millimeters) for the apertured walls 36 and 28. In the apertured wall surface facing the glass sheets, the slots of the obliquely slotted modules 31 are parallel to one another and are spaced from one another approximately ¼ inch (approximately 6.35 millimeters) along the length of the modules (transverse to the axis of the glass movement). The modules near the furnace exit extend obliquely of said axis. The apertured walls of the transversely slotted modules 32 comprise four slots, each about 15 mils (approximately 0.38 millimeter) wide extending continuously along the length of the apertured module wall normal to said axis.

The dimensions and arrangements described are subject to some modification within limits, depending on various parameters enumerated previously. It is also understood that the number and arrangements of slots of the modules further downstream in the cooling station may vary from the exact number and arrangement shown. However, it is preferred to have three to five slots per transversely slotted module. A typical slot arrangement comprises five slots equally distant to one another across the width of an apertured wall of a module having successive widths of 21 mils (approximately 0.53 millimeter), 21 mils (approximately 0.53 millimeter), 15 mils (approximately 0.38 millimeter), 21 mils (approximately 0.53 millimeter) and 21 mils (approximately 0.53 millimeter), respectively. Also, the width and separation of the obliquely extending slots in the upstream portion of the cooling area 16 may vary to some extent, depending on the thickness of glass sheet being treated. Generally, a higher cooling rate is needed for thinner glass sheets than for thicker glass sheets so that a larger number of thinner, more closely spaced slots is generally required for tempering thinner glass sheets than for thicker glass sheets.

As stated earlier, the jacks 41 are provided to engage the lower common plenum chambers 24 to adjust the position and orientation of the latter for alignment of the lower elongated bed of the cooling area 16 with the bed 12 in the furnace 10. The upper common plenum chambers 22 are provided with adjustment means to raise and lower said upper common plenum chambers 22 to control the vertical distance that the upper module walls 36 are spaced above and parallel to the lower module walls 38. This distance varies with the thickness of glass sheet being processed.

Typical operating parameters and test results obtained from the illustrative embodiments of apparatus conforming to the present invention will now be provided.

An inspection test has been developed at PPG Industries, Inc., the assignee of this invention, as a means of determining the optical qualities of glass sheets fabricated into production articles. In this test, a screen having a pattern of equi-distant horizontal and vertical intersecting lines that form a so-called zebra board pattern is illuminated. A glass sheet to be tested in supported before the screen and is oriented at an oblique angle to the screen. The illuminated pattern is viewed through the tested glass sheet. The latter is then evaluated as to its optical properties by assigning a rating of 1 (worst optical properties to 5 (best optical properties) by reference to standard samples that represent each rating. A rating of 3 is acceptable commercially. Ratings of 4 and 5 are increasingly superior and those of 2 and 1 are inferior to ratings of 3.

In the production tests reported hereinafter, glass sheets of clear float glass having a nominal thickness of ⅛ inch (3 millimeters), a length of 76 inches (193 centimeters) and a width of 34 inches (86 centimeters) were tempered on a gas hearth type of tempering apparatus comprising different arrangements of modules according to the present invention. In these production runs, there were four longitudinally spaced, obliquely slotted modules (exemplified by modules 31) followed by additional longitudinally spaced, transversely slotted modules (exemplified by modules 32 the number of which was varied for different tests) followed by spaced rows of rosette modules in the remainder of the first sub-zone (1A) of the first of five common plenum chambers 22 and 24 to total 24 rows followed by 31 rows of rosette modules 33 in the second sub-zone of each of the first upper and lower common plenum chambers 22 and 24. An additional 55 transverse rows of pipe nozzles were provided in longitudinally spaced relation along each of the remaining four upper and lower common plenum chambers 22 and 24 of the cooling area 16.

Table I reports the details of these production tests.

TABLE I
Performance Data For Cooling Area Provided with Slit Module-Rosette Module Combinations To Produce Large Rectangular Articles

| Description | Test #1 | Test #2 |
|---|---|---|
| Number of obliquely slit module rows | 4 | 4 |
| Number of transversely slit module rows | 11 | 7 |
| Number of rosette module rows | 40 | 44 |
| Number of rows in first sub-zone (1A) | 24 | 24 |
| Number of rows in second sub-zone (1B) | 31 | 31 |
| Production of plates per hour | 264 | 264 |
| Glass Surface Temperature at Furnace Exit | 1220° F. (660° C.) | 1220° F.(660° C.) |
| Glass Surface Temperature at row 55 | 780° F. (416° C.) | 780° F. (416° C.) |
| Furnace speed (inches/min)/(mm/sec.) | 410/174 mm/sec. | 393/166 mm/sec |
| Cooling area speed (inches/min)/(mm/sec.) | 1160/491 mm/sec. | 1060/449 mm/sec |
| Plenum Pressures (O.S.I./Pa) | | |
| Zone 1A   Top | 30(12,900 Pa) | 26(11,200 Pa) |
| Bottom | 30(12,900 Pa) | 28.5(12,300 Pa) |
| Zone 1B   Top | 29(12,500 Pa) | 28(12,100 Pa) |
| Bottom | 26(11,200 Pa) | 24(10,300 Pa) |
| Second Zone   Top | 7(3,020 Pa) | 7(3,020 Pa) |
| Bottom | 8.8(3,790 Pa) | 8.8(3,790 Pa) |
| Third Zone   Top | 7(3,020 Pa) | 7(3,020 Pa) |
| Bottom | 9.7(4,180 Pa) | 9.8(4,220 Pa) |
| Module to Glass Distance (mils-mm) | | |
| Lower side (Entrance/Exit) | 280(7.1mm)–310(7.9mm) | 280(7.1mm)–310(7.19mm) |
| Upper side (Entrance/Exit) | 290(7.4mm)–315(8.0mm) | 290(7.4mm)–315(8.0mm) |
| Average Largest Particle Size (Less than 4.25 grams is acceptable) | 2.70 grams | 2.40 grams |
| Surface Compression Stress | 17,200 psi (1.15 × $10^8$ Pa) | 18,400 psi (1.22 × $10^8$ Pa) |
| Optical Quality rating (5 best: 3 acceptable) | 5 | 5 |

The following table compares the production of trapezoidal shapes having a nominal thickness of 3 millimeter using the previous all rosette module tempering apparatus with the apparatus modified to provide the first 4 rows of modules having obliquely extending slots followed by the next eleven rows of transversely slotted modules followed by rosette modules.

TABLE II
Production Of Trapezoidal Articles On Gas Hearth Comparison Of All Rosette Module Cooling Area With Modified Slot Module - Rosette Module Combination Cooling Area

| Description | All Rosette Modules | Slot and Rosette Modules |
|---|---|---|
| Maximum glass surface | 1245° F.(674° C.) | 1220° F.(660° C.) |
| Furnace Speed (in/min)/(mm/sec) | 410(174mm/sec) | 405(171mm/sec) |
| Cooling area speed (in/min)/(mm/sec) | 1000(423mm/sec) | 1010(427mm/sec) |
| Plenum Pressures (O.S.I./Pa) | | |
| Zone 1A   Top | 28(12,100 Pa) | 30.2(13,000 Pa) |
| Bottom | 32(13,800 Pa) | 30(12,900 Pa) |
| Zone 1B   Top | 30(12,900 Pa) | 29.5(12,700 Pa) |
| Bottom | 26(11,200 Pa) | 26(11,200 Pa) |
| Second Zone   Top | 5(12,200 Pa) | 7(3,000 Pa) |
| Bottom | 7.6(3,300 Pa) | 8.8(3,800 Pa) |
| Third Zone   Top | 6(2,600 Pa) | 7(3,000 Pa) |
| Bottom | 10(4,300 Pa) | 9.7(4,200 Pa) |
| Average Largest Particle Size | 1.30 grams | 1.00 grams |
| Surface Compression Stress | 16,900 PSI(1.13 × $10^8$ Pa) | 18,500 PSI(1.23 × $10^8$ Pa) |
| Optical Quality rating | 5 | 5 |

Production runs of glass sheets having a nominal thickness of 3 millimeters using all slot modules in the first zone of five zones in the cooling area of the production apparatus had a production yield of 86 percent. After conversion to a combination of slotted modules followed by rosette modules in the first zone, according to the teachings of the present invention, production yields increased to over 92 percent, and further increases are expected with additional production line experience. In addition, Q-lines have been virtually eliminated from production articles of 3 millimeters thickness since the cooling area has been modified to provide eleven or more slotted modules at the upstream end of the cooling area. Production of thicker glass sheets (nominal thickness 3/16 inch—4.8 millimeter) requires a minimum of three rows of slot modules having a dimension of 1 inch (25.4 millimeters) along the length of glass sheet movement and a spacing between adjacent rows of ½ inch (12.7 millimeters) with thin slots having an approximate width of 20 mils (0.5 millimeter) to replace corresponding rows of rosette modules in the upstream portion of the cooling area to reduce Q-line distortion to an acceptable level.

The exact number of slot modules and exhaust spaces required to eliminate Q-lines and still avoid flutter depends on many parameters such as maximum glass temperature, temper level desired, speed of glass sheet movement through the cooling area, pressure and volume and temperature of tempering medium applied against the opposite major glass sheet surfaces, the module to glass sheet distance in the cooling area, the module width along the path of glass sheet travel, and the number, spacing and dimensions of the slots and the exhaust spaces between adjacent modules that replace the rosette modules in the upstream portion of the cooling area. It is preferred that the thin, discrete, laminar streams that are applied through the slotted modules oppose one another and that their cooling effect on the glass sheets be sufficient to reduce the surface temperature to below the temperature at which tempering medium applied through rosette modules would tend to form observable Q-lines on the glass sheet surfaces. At the same time, the maximum number of slotted modules should be limited to a number less than the minimum number that experience dictates will cause flutter. For typical glass sheet thicknesses ranging from less than 3 millimeter to more than 5 millimeter, the number of slotted modules one inch (25.4 millimeters) wide separated by ½ inch (12.7 millimeters) should not exceed about 15. The 40 rows of rosette modules in the remainder of the first zone of the cooling area provide a smoother support that is less prone to promote increased flutter than a continuation of the spaced slotted modules.

The form of the invention shown and described in this disclosure represents an illustrative preferred embodiment and certain modifications thereof. It is understood that various changes may be made without departing from the gist of the invention as defined in the claimed subject matter that follows:

We claim:

1. A method of tempering glass sheets comprising:
    heating a glass sheet to a temperature sufficient for tempering;
    passing the heated glass sheet through a first cooling zone wherein each of the opposite surfaces of the glass sheet is subject to a plurality of thin, discrete, spaced-apart, parallel, laminar streams of relatively cool tempering medium angularly directed toward the glass surface so as to cool each portion of the glass sheet passing therethrough at a relatively high rate of heat transfer to rapidly harden the surfaces of the glass sheet and thereby substantially reduce subsequent formation of optical distortion in the glass, exposing each portion of the glass sheet to the laminar streams for a sufficiently limited period of time to substantially avoid inducing fluttering of the glass sheet, and withdrawing the glass sheet from the first cooling zone before the desired degree of temper is fixed in the glass;
    immediately passing the incompletely tempered glass sheet from the first cooling zone into a second cooling zone wherein each of the opposite major surfaces of the glass sheet is subjected to a plurality of diffuse patterned streams of relatively cool tempering medium which provide a relatively lower heat transfer rate and a relatively flutter-free support for the glass sheet, and maintaining each portion of the glass sheet in the second cooling zone until the desired degree of temper is fixed in the glass.

2. The method of claim 1 including initially directing at least some of said thin, discrete streams of tempering medium in said first zone against said major surfaces of the glass sheet in an oblique direction having a component of motion in the direction of glass sheet travel.

3. The method of claim 2 wherein an additional group of said thin, discrete streams of tempering medium in the first zone are directed against said major surfaces of the glass sheet in a direction having a smaller component of motion in the direction of glass travel than said initially directed streams.

4. The method of claim 1 wherein a series of glass sheets are conveyed through said first and second cooling zones while being supported in a generally horizontal orientation on a layer of said tempering medium.

5. The method of claim 1 wherein said laminar streams of tempering medium are issued from elongated slots having a width of about 1/100 inch (0.25 millimeter) to about 1/32 inch (0.8 millimeter).

* * * * *